United States Patent
Pan et al.

(10) Patent No.: US 7,817,556 B2
(45) Date of Patent: Oct. 19, 2010

(54) MODIFICATION OF POLICING METHODS TO MAKE THEM MORE TCP-FRIENDLY

(75) Inventors: Rong Pan, Sunnyvale, CA (US); Flavio Bonomi, Palo Alto, CA (US); George Varghese, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 833 days.

(21) Appl. No.: 11/408,293

(22) Filed: Apr. 20, 2006

(65) Prior Publication Data

US 2007/0248005 A1    Oct. 25, 2007

(51) Int. Cl.
G01R 31/08    (2006.01)
(52) U.S. Cl. .................... 370/235.1; 370/229
(58) Field of Classification Search .......... 370/235.1, 370/235, 229–230
See application file for complete search history.

(56) References Cited

U.S. PATENT DOCUMENTS

| | | | | |
|---|---|---|---|---|
| 5,570,360 | A * | 10/1996 | Klausmeier et al. | 370/232 |
| 6,192,032 | B1 * | 2/2001 | Izquierdo | 370/230 |
| 6,522,628 | B1 * | 2/2003 | Patel et al. | 370/230.1 |
| 6,937,561 | B2 * | 8/2005 | Chiussi et al. | 370/229 |
| 7,149,187 | B1 | 12/2006 | Jacobson et al. | |
| 2003/0031131 | A1 * | 2/2003 | Bottiglieri et al. | 370/235 |
| 2003/0056413 | A1 * | 3/2003 | Wiemer et al. | 40/730 |
| 2005/0025057 | A1 * | 2/2005 | Huo | 370/235.1 |
| 2006/0187945 | A1 * | 8/2006 | Andersen | 370/412 |
| 2007/0058548 | A1 * | 3/2007 | Babonneau et al. | 370/235.1 |

FOREIGN PATENT DOCUMENTS

WO    WO2007/124296    11/2007

OTHER PUBLICATIONS

Floyd, S. and Jacobson, V., "Random Early Detection Gateways for Congestion Avoidance", IEEE/ACM Transactions on Networking, Aug. 1993, pp. 1-32.

(Continued)

*Primary Examiner*—Phuc Tran
(74) *Attorney, Agent, or Firm*—Weaver Austin Villeneuve & Sampson LLP

(57) ABSTRACT

Various improvements are provided for prior art policing methods, including token bucket methods and virtual time policing methods. Some preferred methods of the invention involve assigning a non-zero drop probability even when the packet would otherwise have been transmitted according to a prior art policing method. For example, a non-zero drop probability may be assigned even when there are sufficient tokens in a token bucket to allow transmission of the packet. A non-zero drop probability may be assigned, for example, when a token bucket level is at or below a predetermined threshold or according to a rate at which a token bucket is being emptied. Some implementations involve treating a token bucket as a virtual queue wherein the number of free elements in the virtual queue is proportional to the number of remaining tokens in the token bucket. Such implementations may involve predicting a future virtual queue size according to a previous virtual queue size and using this predicted value to calculate a drop probability.

17 Claims, 10 Drawing Sheets

OTHER PUBLICATIONS

"Traffic Management Specification" Version 4.0, The ATM Forum Technical Committee, af-tm-0056.000, Apr. 1996, 107 pages.

Hollot, C.V. et al., "A Control Theoretic Analysis of RED", Proceedings of IEEE INFOCOM, Apr. 2001, pp. 1-10.

Chait, Y., et al., "Throughput Differentiation Using Coloring at the Network Edge and Preferential Marking at the Core", IEEE/ACM Trnasactions on Networking, vol. 13, No. 4, Aug. 2005, pp. 743-754.

International Search Report and Written Opinion; mailed Apr. 9, 2008 in related PCT Application PCT/US07/66743.

* cited by examiner

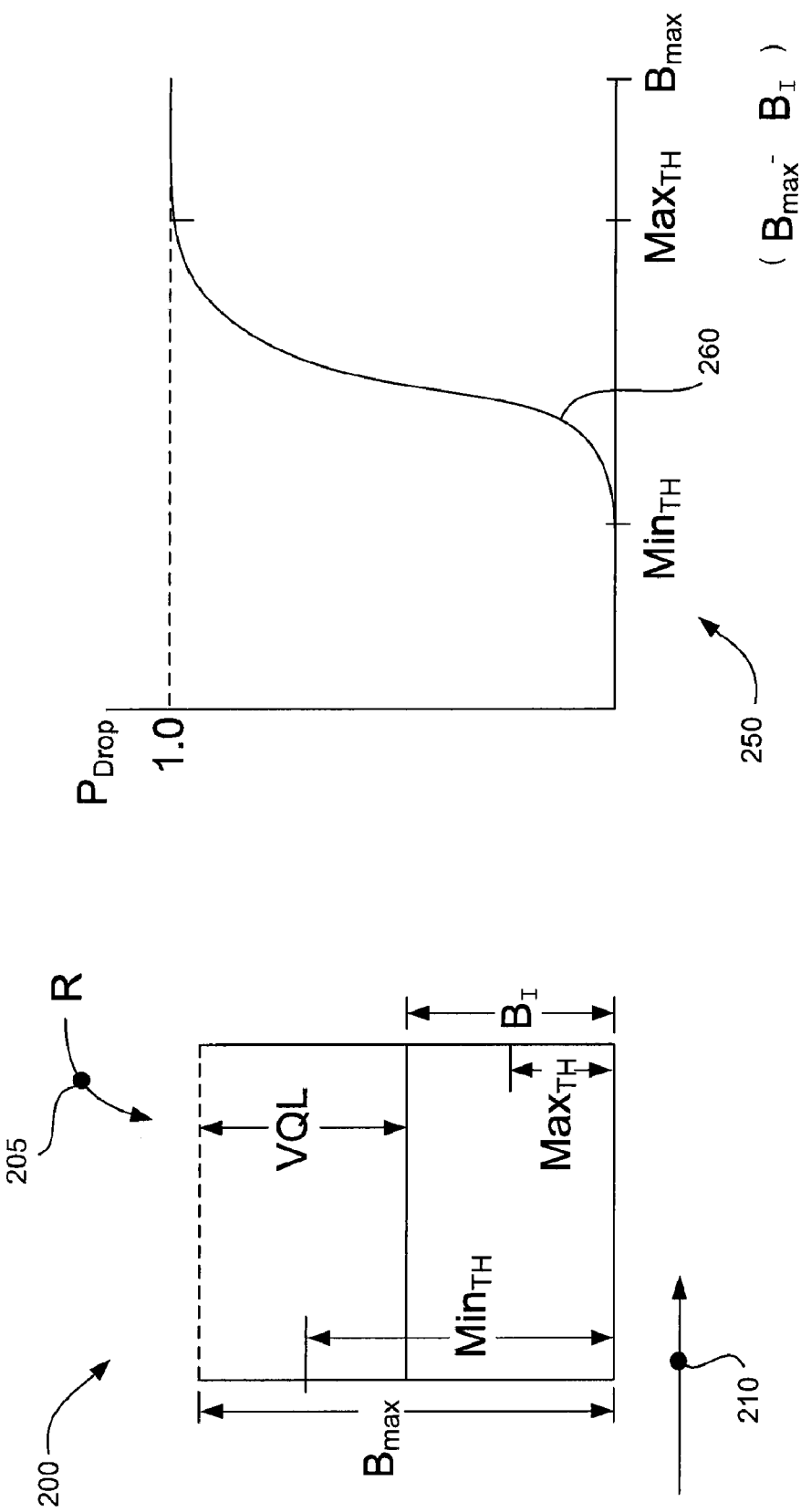

MODIFICATION OF POLICING METHODS TO MAKE THEM MORE TCP-FRIENDLY

BACKGROUND OF THE INVENTION

Congestion avoidance techniques are essential to the operation of networks and network devices. One such technique known in the art as "Random Early Discard" or "RED" is described in a publication by S. Floyd and V. Jacobson entitled "*Random Early Detection Gateways for Congestion Avoidance*," (Transactions on Networking, August 1993) (the "Floyd and Jacobson paper"), which is hereby incorporated by reference for all purposes.

The basic principle behind RED is to control the average length of a network device's (e.g., a router's) output queue in order to avoid long term congestion. To achieve this goal, RED must work with transport protocols, such as TCP, which are equipped with their own congestion avoidance mechanisms and are thus capable to react to congestion indications generated by devices implementing RED. The RED algorithm has been implemented in some output-buffered network devices, including the Catalyst 6500 switch and the 7200 series router provided by Cisco Systems, Inc., to prevent congestion of output buffers.

Graph 100 of FIG. 1A illustrates the operation of RED. For each incoming packet, the average queue length is calculated. (Please note that the terms "packet" and "frame" may be used interchangeably herein.) If the average queue length is below a predefined minimum threshold 105, the packet is accepted and stored in the output queue for transmission. If the average queue size is above the minimum threshold 105 but below a predefined maximum threshold 110, a packet marking probability is computed and the packet gets marked according to this probability. The marking probability is proportional to the average queue size. Therefore, when the queue is larger, there is a higher probability for an incoming packet to get marked or dropped. Finally, if the average queue size is above the maximum threshold 110, all incoming packets are marked or dropped until the average queue size falls again below the maximum threshold 110.

It is responsibility of the transport protocol to take the appropriate countermeasures when it detects packets marked by RED. When TCP is being used in the absence of an explicit method of marking packets, packets can only be "marked" by discarding them, with TCP interpreting the loss of packets as a congestion indication. When a TCP source detects only a few dropped packets, it can recover via a "fast retransmit," wherein its transmission rate is reduced by half.

However, service providers must apply other network controls in order to regulate or "police" various aspects of network traffic. For example, network administrators need to ensure that network resources are allocated in a fair and predictable manner, while still allowing customers to transmit bursts of data when appropriate. Therefore, many network devices also apply some form of policing method in addition to RED (or in addition to a modified version of RED).

For example, FIG. 1B illustrates the operation of token bucket 150 according to one such policing method. Each of tokens 185 may be considered an authorization for transmitting a predetermined unit of data; therefore, tokens are usually measured in bits or bytes. Tokens 185, which are represented as drops in FIG. 1B, flow into token bucket 150 at a fixed rate R, which is measured in data units per time unit (e.g., bits per second).

Token bucket 150 has a capacity 190. In this example, token bucket 150 has a capacity of $B_{MAX}$ data units. Capacity $B_{MAX}$ is also referred to as the "burst size" of token bucket 150, because it is equal to the maximum data burst allowed by controller 192. Accordingly, token bucket 150 allows data bursts, but places limits on how bursty traffic can be.

Instantaneous token bucket level $B_1$ 160 is a measure of the number of tokens or data units in token bucket 150 at any given time. In this example there is no physical queue associated with token bucket 150. Controller 192 will cause an incoming packet to be dropped immediately if there are insufficient tokens in token bucket 150 to permit transmission of the packet. In other words, if incoming packet 196 were larger than $B_1$ data units, packet 196 would be dropped.

Other policing methods, similar to the one just described, have been introduced in the past. Examples include two methods that are discussed in "*Traffic Management Specification*" Versions 4.0 and 4.1 (The ATM Forum Technical Committee 1996), under the names of Virtual Scheduling and Continuous-State Leaky Bucket Algorithm, respectively, which are hereby incorporated by reference. In the cited references, these schemes apply to the case of ATM networking, but have been generalized to the case of general packet networks.

In other policing methods, however, there may be an associated buffer. A certain number of packets could accumulate in the buffer until there are enough tokens in the token bucket 150 to permit the data to be transmitted. However, when the buffer is full, all incoming packets will be dropped. This is a "tail drop" or "tail discard" method that was once commonly used in network devices.

Whether or not incoming packets are buffered, packets will eventually be dropped when they are arriving faster than R, the rate at which token bucket 150 (or the like) is replenished. When many successive packets are dropped, this will cause TCP senders to go into a "timeout" that may last on the order of hundreds of milliseconds. Long-lived TCP senders respond much more satisfactorily to RED (or the like) than to "tail drop" methods.

Therefore, some of the potential advantages of implementing RED in a network device are not realized because prior art policing methods are also being implemented in the same device. It would be desirable to implement methods and devices that overcome at least some of the aforementioned shortcomings of the prior art.

SUMMARY OF THE INVENTION

The present invention provides various improvements upon a broad class of policing algorithms, including but not limited to the ones described or referenced herein. Some preferred methods of the invention involve assigning a non-zero drop probability (sometimes referred to herein as a "drop probability" or the like) even when the packet would otherwise have been transmitted according to a prior art policing method.

For example, a non-zero drop probability may be assigned even when there are sufficient tokens in a token bucket to allow transmission of the packet. A non-zero drop probability may be assigned, for example, when a token bucket level is at or below a predetermined threshold. Some implementations involve treating a token bucket as a virtual queue wherein the number of free elements in the virtual queue is proportional to the number of remaining tokens in the token bucket.

Alternatively (or additionally), a non-zero drop probability may be assigned according to a rate at which a token bucket is being emptied. Such implementations may involve predicting a future virtual queue size according to a previous virtual queue size and using this predicted value to calculate a drop probability.

Some aspects of the invention provide a method of controlling a network device. The method includes the following steps: receiving a packet; determining that there are sufficient tokens in a token bucket to allow transmission of the packet; and applying a control procedure to determine whether to drop the packet. The control procedure can involve determining a token bucket level and/or a rate at which a token bucket level is being changed.

The control procedure can involve treating a difference between a token bucket capacity and a token bucket level as a virtual queue, wherein a determination of whether to drop packets is based in part on a virtual queue size. For example, the method may involve predicting a second virtual queue size based on a first virtual queue size; and calculating a drop probability according to a predicted second virtual queue size.

The method may involve assigning a zero probability that the packet will be dropped when the token bucket level exceeds a predetermined level and assigning a non-zero probability that the packet will be dropped when the token bucket level is below a predetermined level. The non-zero probability may vary according to the extent by which the token bucket level is below a predetermined level and/or according to a rate at which the token bucket level is being changed.

Alternative methods the invention include the steps of receiving a packet, determining that sufficient time has elapsed to allow transmission of the packet according to a virtual time policing method; and assigning a non-zero probability that the packet will be dropped.

All of the foregoing methods, along with other methods of the present invention, may be implemented by software, firmware and/or hardware. For example, the methods of the present invention may be implemented by computer programs embodied in machine-readable media. Some aspects of the invention can be implemented by network devices or portions thereof, such as individual line cards of a router.

One such embodiment of the invention provides a line card for a network device. The line card includes: an interface configured for receiving packets and at least one logic device. The logic device is configured to determine whether there are sufficient tokens in a token bucket to allow transmission of the packet and to apply a control procedure to determine whether to drop the packet, even when there are sufficient tokens in a token bucket to otherwise allow transmission of the packet. The line card may or may not include a buffer for incoming packets.

BRIEF DESCRIPTION OF THE DRAWINGS

FIGS. 2A and 2B illustrate the operation of a token bucket according to some methods of the invention.

DETAILED DESCRIPTION OF THE PREFERRED EMBODIMENTS

In this application, numerous specific details are set forth in order to provide a thorough understanding of the present invention. It will be apparent, however, to one skilled in the art, that the present invention may be practiced without some or all of these specific details. In other instances, well known process steps have not been described in detail in order not to obscure the present invention.

The present invention provides various methods and devices to make policing methods, including token bucket methods and virtual time policing methods, more "TCP friendly." Some preferred methods of the invention involve assigning a non-zero drop probability even when the packet would otherwise have been transmitted according to prior art policing methods. For example, a packet may be dropped even when there are sufficient tokens in a token bucket to allow transmission of the packet. The packet will be dropped because one or more criteria are indicating that a network is becoming congested or may soon become congested.

Such criteria may involve a measure of how many tokens are in a token bucket. The criteria could involve relative measures, e.g., a predetermined percentage or fraction of the capacity B of the token bucket. Alternatively, the criteria could involve absolute measures, such as the number of tokens (or the like) remaining in the token bucket, the number of tokens that have been removed from the token bucket, etc. Some implementations may involve taking the average of such criteria over time. However, as discussed below, some such implementations have shown to be problematic.

Alternative implementations of the invention involve marking packets instead of, or in addition to, dropping the packets. For example, certain thresholds could trigger marking a packet and downstream processes could trigger packet drops. However, such implementations are not preferred because they require coordination with downstream devices and methods.

Some implementations of the invention assign a non-zero drop probability even when there are sufficient tokens in a token bucket to allow transmission of the packet. A non-zero drop probability may be assigned, for example, when a token bucket level is at or below a predetermined threshold. The drop probability preferably increases to 1 when one or more predetermined criteria are attained.

One such example will now be described with reference to FIGS. 2A, 2B and 3. FIG. 2A illustrates token bucket 200 with capacity $B_{MAX}$ data units. Tokens 205 are added to token bucket 200 at a rate R. The instantaneous token bucket level $B_1$ indicates how many data units or tokens have accumulated in token bucket 200 at any given moment.

Figure 1A:
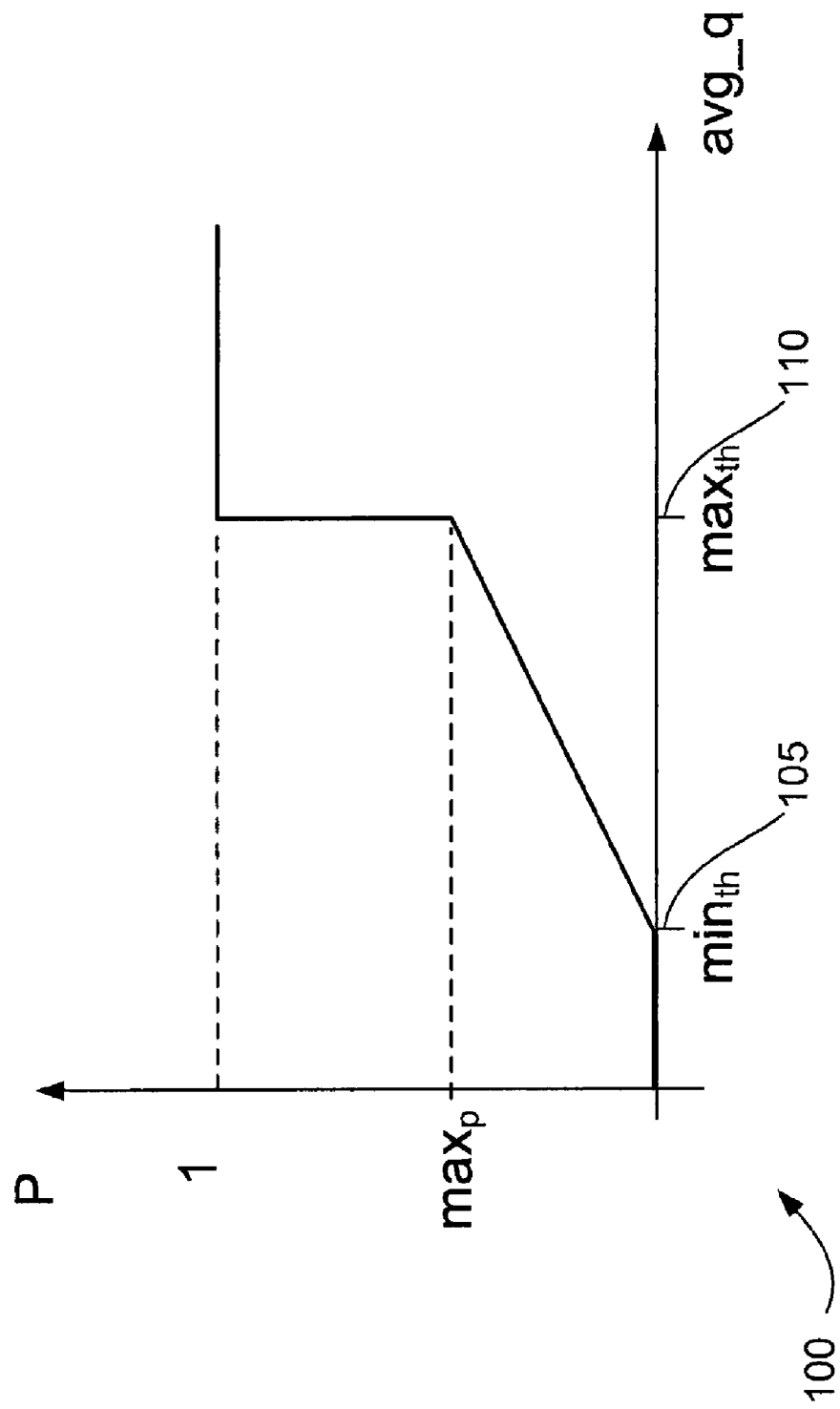
FIG. 1A is a graph illustrating the RED algorithm.
Figure 1B:
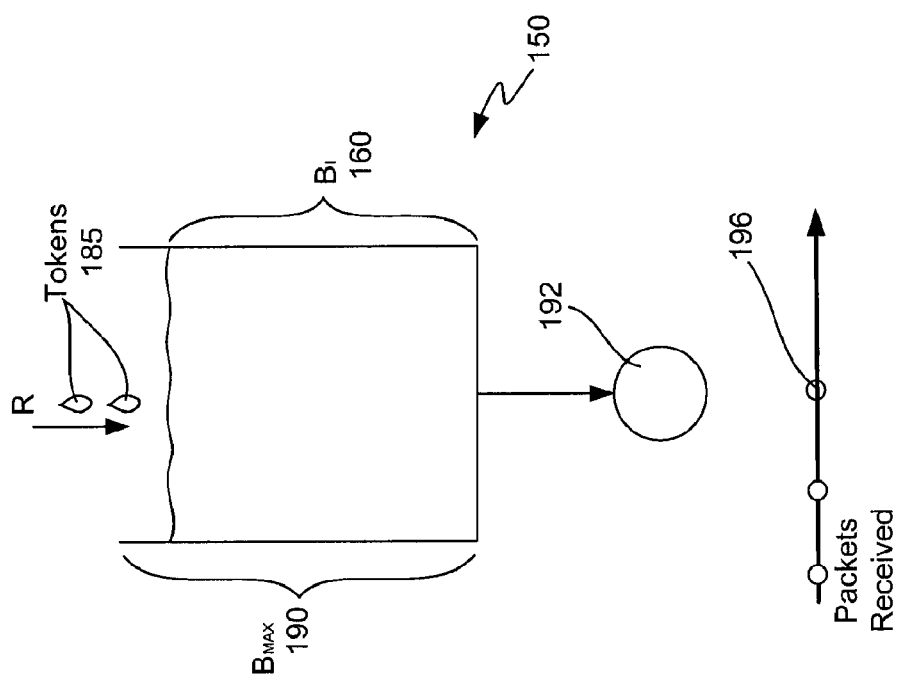
FIG. 1B illustrates the operation of a token bucket policing method.
Figure 3:
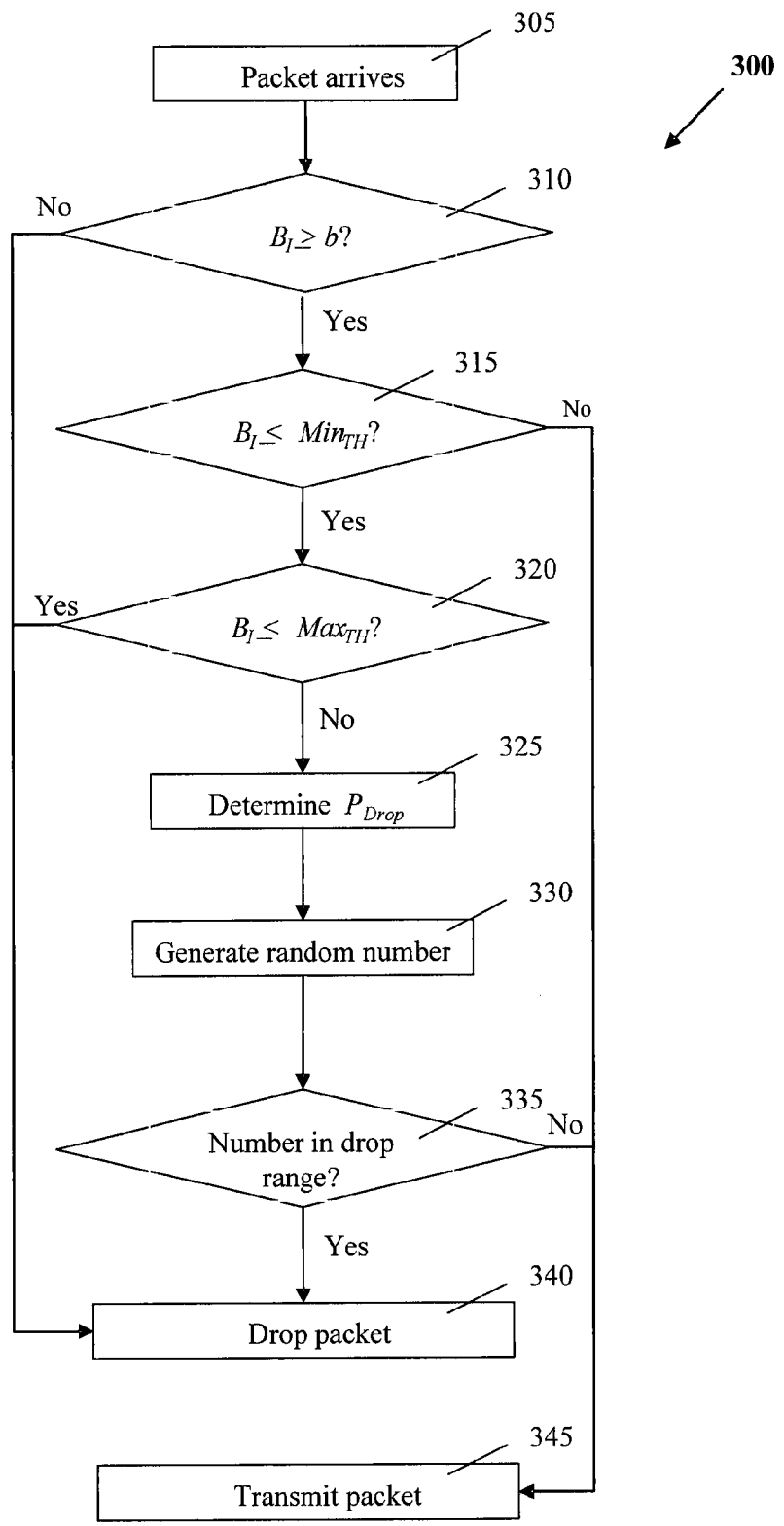
FIG. 3 is a flow chart that outlines some methods of the invention.

Referring now to FIG. 3, method 300 of the invention will now be described. In step 305, a packet 210 arrives (see FIG. 2A) that is b data units in size. In step 310, it is determined (e.g., by a logic device of a line card) whether there are sufficient tokens available to permit packet 210 to be transmitted, i.e., whether $B_1 \geq b$. If not, the packet is dropped. (Step 340.) In alternative implementations, packet 210 may be temporarily stored in a buffer, space permitting.

However, even if there are sufficient tokens in token bucket 200, further processing is required before it is determined whether to transmit or drop packet 210. In this example, token bucket levels $Min_{TH}$ and $Max_{TH}$ correspond with drop probability thresholds. One example of such drop probability thresholds are shown in FIG. 2B. In graph 250, the vertical axis measures drop probability $P_{drop}$ and the horizontal axis measures the quantity $B_{MAX}-B_1$. The quantity $B_{MAX}-B_1$ increases linearly as $B_1$ decreases, i.e., as token bucket 200 empties. The values of $Min_{TH}$ and $Max_{TH}$, the shape of curve 260, etc., are purely exemplary.

Some implementations involve treating a token bucket as a virtual queue wherein the number of free elements in the virtual queue is proportional to the number of remaining tokens in the token bucket. The length of the virtual queue is inversely proportional to the token bucket level: referring again to FIG. 2A, virtual queue length VQL is equal to the quantity $B_{MAX}-B_1$.

It will be observed from FIG. 2B that in this example, for values $B_{MAX}-B_1$ that are less than or equal to $Min_{TH}$ (i.e., that $B_1$ is greater than or equal to $Min_{TH}$), the drop probability is zero. Accordingly, further processing is only required if it is determined in step 315 that $B_1$ is less than or equal to $Min_{TH}$. Otherwise, the packet is transmitted (step 345).

When $B_1$ is less than or equal to $Min_{TH}$, a non-zero drop probability $P_{drop}$ will be assigned. In this example, $P_{drop}$ is equal to 1 if $B_{MAX}-B_1$ is greater than or equal to $Max_{TH}$. Accordingly, when it is determined in step 320 that $B_1$ is less than or equal to $Max_{TH}$, the packet is dropped. (Step 340.)

However, if it is determined that $B_1$ is between $Min_{TH}$ and $Max_{TH}$, a drop probability will be determined. In this example, the drop probability will be determined according to graph 250. Thereafter, a random number will be generated (step 330) and it will be determined whether the random number is associated with dropping the packet or with transmitting the packet. (Step 335.) The packet is dropped or transmitted accordingly.

Alternatively (or additionally), a non-zero drop probability may be assigned, at least in part, according to a rate at which a token bucket level is being changed, e.g., being emptied. This change in token bucket level is the rate mismatch between the rate at which tokens are added to the token bucket and rate at which they are being consumed. The latter depends on, e.g., the packet arrival rate and the sizes of arriving packets. Such methods are sometimes referred to as "predictive" methods or the like, because they may be thought of as predicting a future token bucket level or the future value of a related measure, such as VQL.

Figure 4:
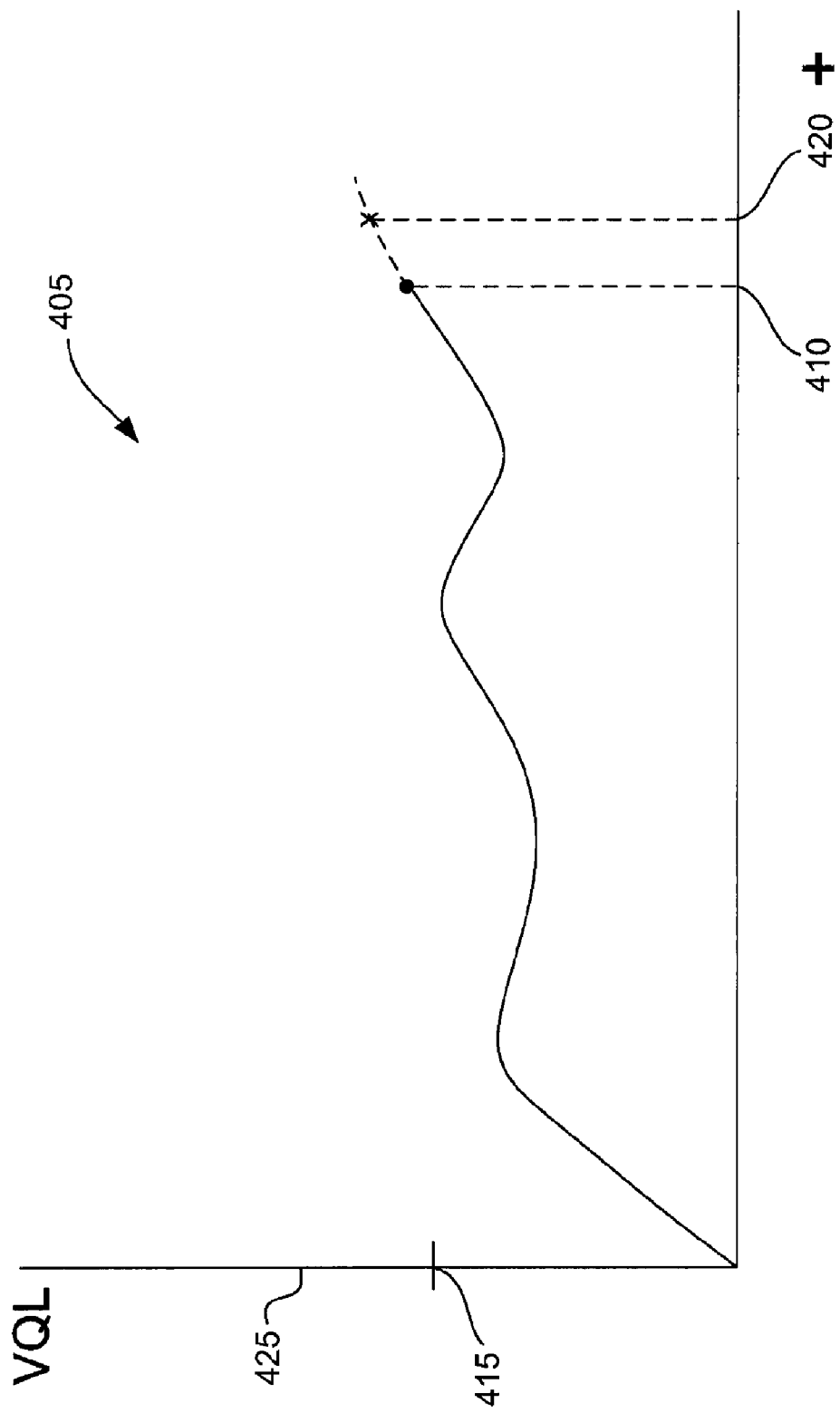
FIG. 4 is a graph illustrating a change in virtual queue length over time.

Referring now to FIG. 4, the vertical axis of graph 405 is a measure of VQL, which we have seen is equal to the quantity $B_{MAX}-B_1$ (see FIG. 2A). The horizontal axis is a measure of time t. At time 410, VQL has length 415. Some methods of the invention involve one or more ways of predicting the value 425 of VQL at a future time 420. Some such methods involve a technique of Euler for predicting a future value of VQL based on a previous value of VQL. Alternative methods include linear extrapolations, curve-fitting methods, etc.

According to some such methods, a drop probability will be calculated according to a predicted future value of VQL, e.g., as described above. Such implementations may involve predicting a future queue size according to a previous queue size and using this predicted value to calculate a drop probability. Alternatively, a drop probability can be calculated (at least in part) according to a rate at which VQL is changing over time, which is the rate at which a token bucket is being emptied. A higher drop probability may be assigned when the token bucket is being emptied at a higher rate.

Such criteria may be combined. For example, such a rate may be calculated only when the token bucket level is at or below a predetermined level (e.g., when the token bucket is less than full, is less than 75% full, less than 50% full, etc.)

Figure 5:
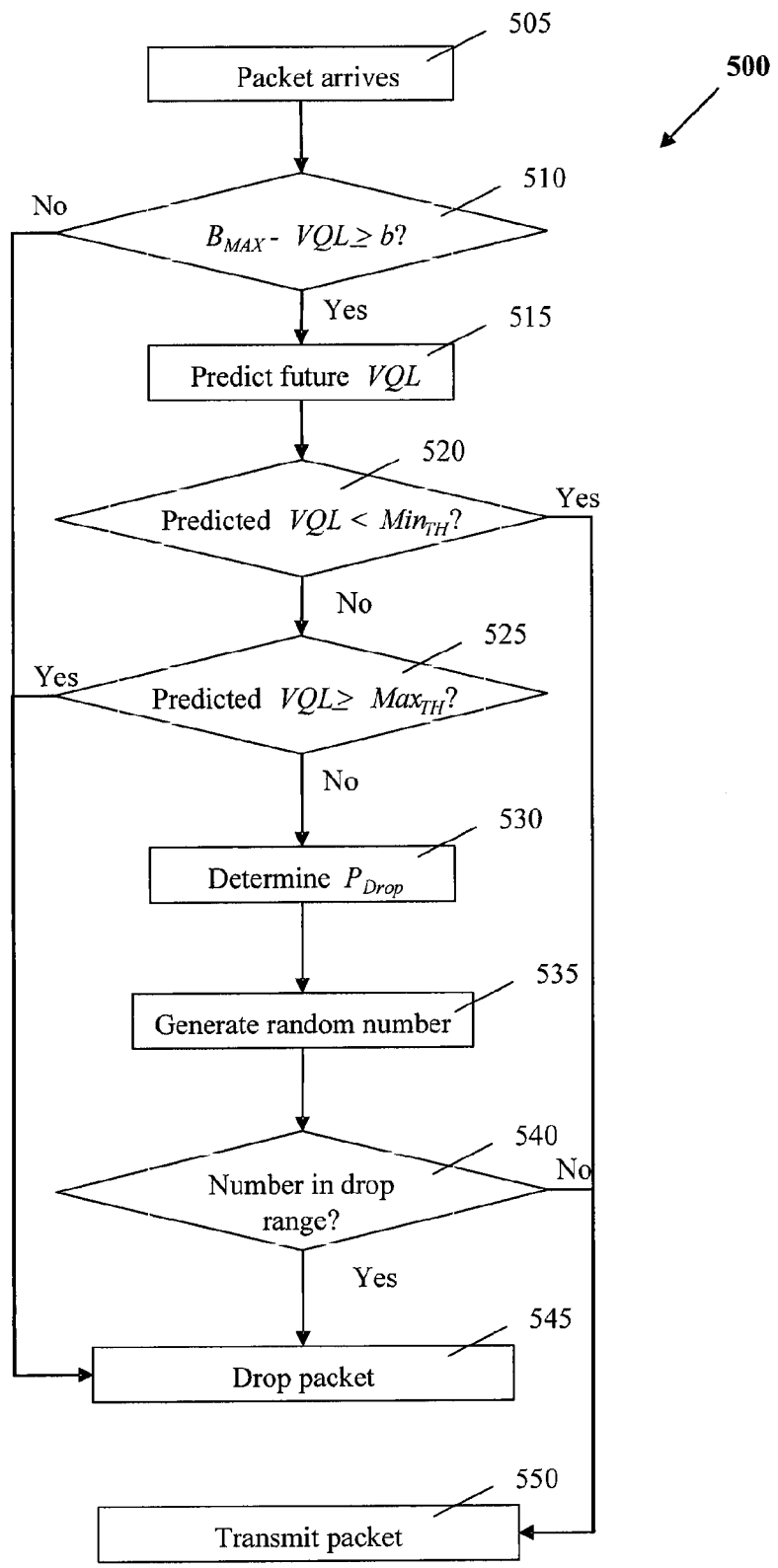
FIG. 5 is a flow chart that outlines alternative methods of the invention.

Method 500 of the invention will now be described with reference to FIG. 5. Method 500 uses a combination of current and predicted values of instantaneous virtual queue length. After a packet of size b arrives (step 505), it is determined whether there are at least b data units of tokens in the respective token bucket. In terms of VQL, it is determined whether $B_{MAX}-VQL \geq b$. (Step 510.) If not, the packet is dropped. (Step 540.)

If there are at least b tokens available, a predicted value of VQL is determined. (Step 515.) If it is determined in step 520 that the predicted value of VQL is less than $Min_{th}$, the packet is transmitted (step 550). Otherwise, the method proceeds to step 525. In alternative implementations, is the actual VQL is less than $Min_{th}$, step 515 is not performed and the packet is transmitted.

In step 525, it is determined whether the predicted value of VQL is greater than or equal to $Max_{th}$. If so, the packet is dropped. (Step 545.) If not, a drop probability is determined. (Step 530.) A random number is generated (step 535) and is used to determine whether to drop or transmit the packet.

The methods described herein have been verified analytically according to control theory. Moreover, the methods have been simulated according to a variety of scenarios and have proven to be robust.

It is well known that the throughput of a long-lived TCP flow (e.g. an FTP transfer flows) can be characterized by the following simplified equation while not taking into account the timeout mechanisms:

$$Th_{tcp} = \frac{W}{RTT} = \frac{c}{RTT * sqrt(p)}, \qquad (1)$$

where c is a constant and round-trip time RTT includes not only the propagation delay but also the queuing delay as well. Here, W is the TCP window size and p is the drop/marking probability.

Effectively, there are two ways in which intermediate network elements can affect an end host's TCP behavior: (1) implicitly altering the queue delay or (2) explicitly dropping/marking packets. Queuing delay has a significant effect on TCP throughput. As TCP flows' windows open up, a link becomes congested, which causes increased queuing delay. As a result, TCP flows slow down as the round trip time increases. Note that this is a rather quick response/feedback to the senders: as packets get delayed, the TCP flows' throughputs are slowed down in a mere RTT time: no more acknowledgements means no more packets sent.

From a control-theory point of view, this type of queuing structure is a leaky integrator rather than a pure integrator, which moves the pole at DC to a higher frequency component, 1/RTT. Given this fast underlining queuing structure, the queue length averaging introduced by RED becomes a dominant low frequency component, which stabilizes the overall system. As indicated in "A Control Theoretic Analysis of RED", C. V. Hollot, V. Misra, D. Towsley, D. Gong, Proceedings of INFOCOM, April 2001, which is hereby incorporated by reference, the more averaging RED takes, the more stable the overall TCP+RED system, given reasonable response time constraints.

One might imagine that the techniques of RED could be applied, without modification, to a policer such as a token bucket or leaky bucket policer. However, if there is no physical queue to help slow down the TCP flows, the power of the queuing delay is not present in a token bucket policer. The bucket level of a token bucket policer is a pure integrator of the rate difference between the arrival rate and the policed rate. The TCP flows would not be notified that a link is congested until a loss/marking occurs, which might take many RTT times to occur.

If we treat the token bucket as a virtual queue, intuitively we might believe that we can apply early detection/drop methods using the bucket level as the virtual queue length. Unfortunately, both modeling and simulation have shown that such a system would often provide very poor behavior. The major reason lies in the fact that, if a token-bucket policer is the congested point in a network, there is no physical queue to help regulate TCP flows' throughput. In addition, if we apply random early drop techniques, the feedback to the senders would be delayed even further. As a result, an oscillation occurs as a delayed negative feedback becomes a positive feedback.

Figure 6A:
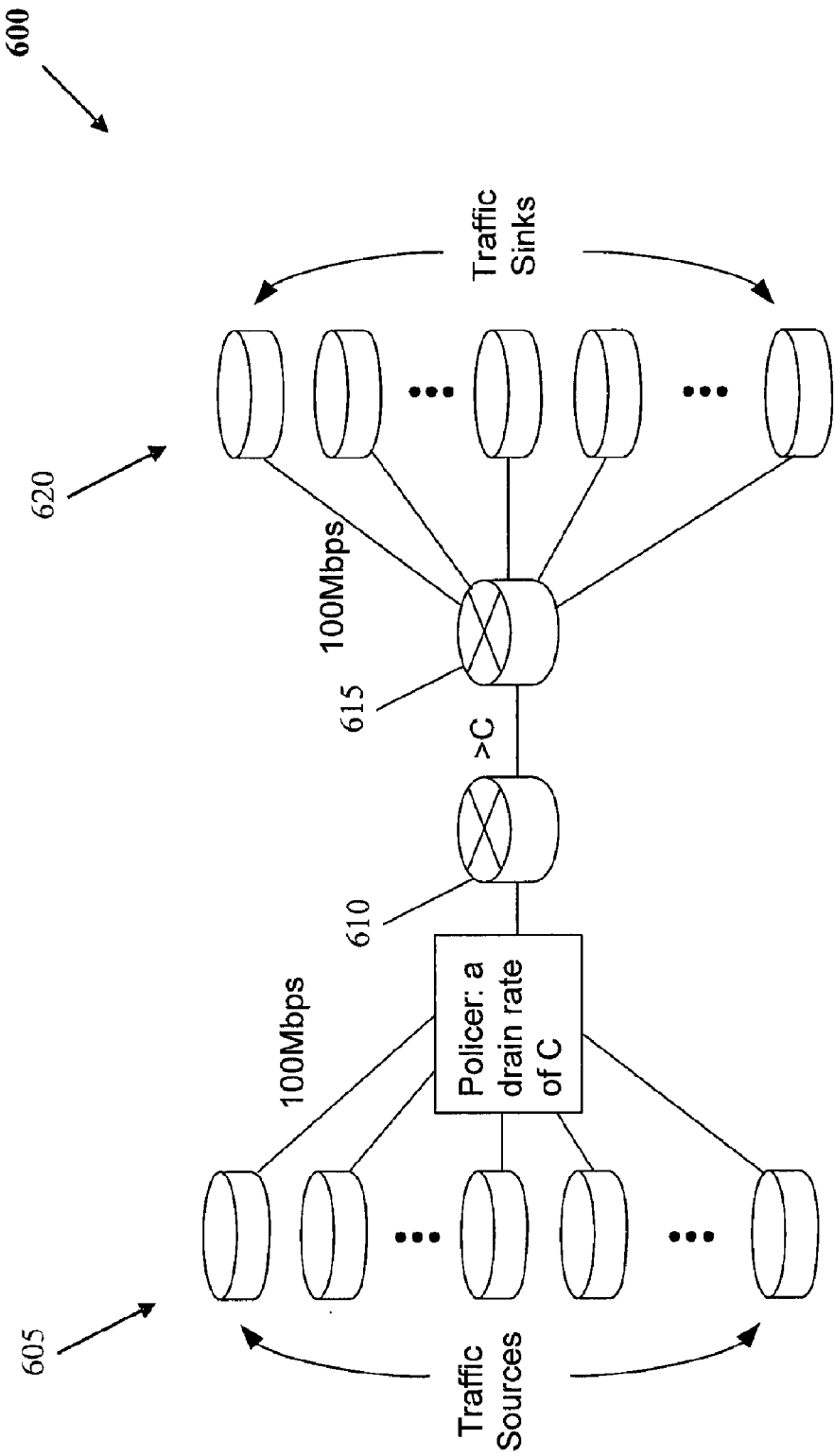
FIG. 6A illustrates a simple network topology used for simulating some implementations of the invention.

FIG. 6A illustrates simplified network 600 that is used as a basis for various simulations that have been performed to test methods of the invention. Traffic sources 605 feed packets into router 610 over 100 Mbps links. Router 610 implements policing methods of the invention. Router 615 distributes packets from router 615 to traffic sinks 620 over 100 Mbps links.

Figure 6B:
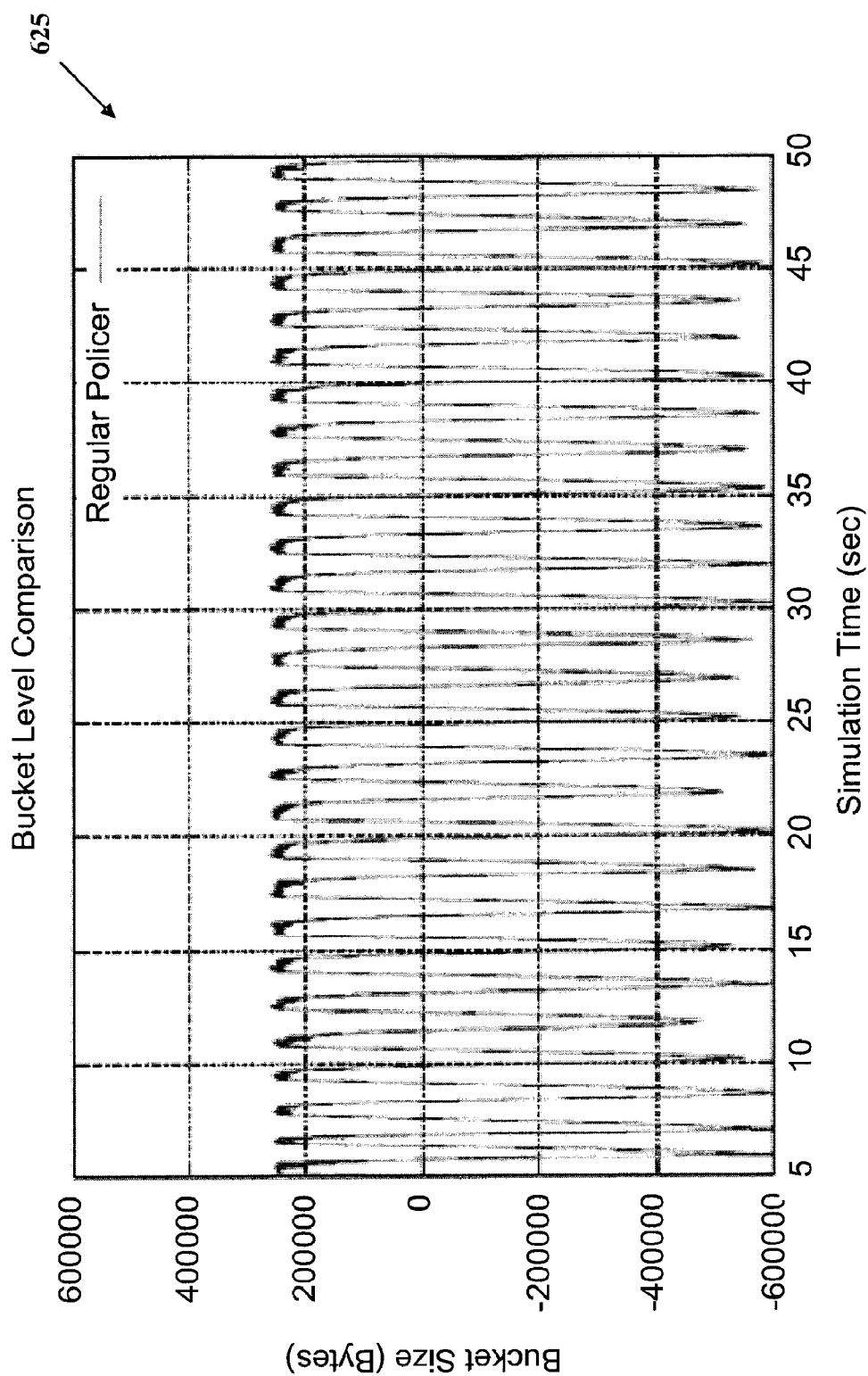
FIGS. 6B and 6C are graphs indicating the results of simulations according to various methods of the invention.

FIG. 6B indicates the results of a simulation of this phenomenon. Graph 625 indicates token bucket level (vertical axis) over time (horizontal axis) for a simulation using average VQL as the basis for an early detection/drop method. In this simulation, the number of long-lived TCP flows is 100. The propagation delay for each is uniformly distributed between 10 ms and 100 ms. The bucket size is 600,000 B. Packet sizes are fixed at 4000 B. As seen in graph 625, the token bucket level is very unstable over time. The token bucket fills, empties, then fills up again.

From a control theory perspective, the pole at DC introduced by the pure integrator takes away 90 degrees of the phase margin. The low frequency pole introduced by the early detection/drop method would quickly take up the remaining 90 degree of the phase margin. Hence, in order for the system to be stable, the less averaging of the virtual queue length, the better. This is the opposite of what one might expect based on prior experience with RED, wherein using average values of queue length provides smoothness and stability.

Figure 6C:
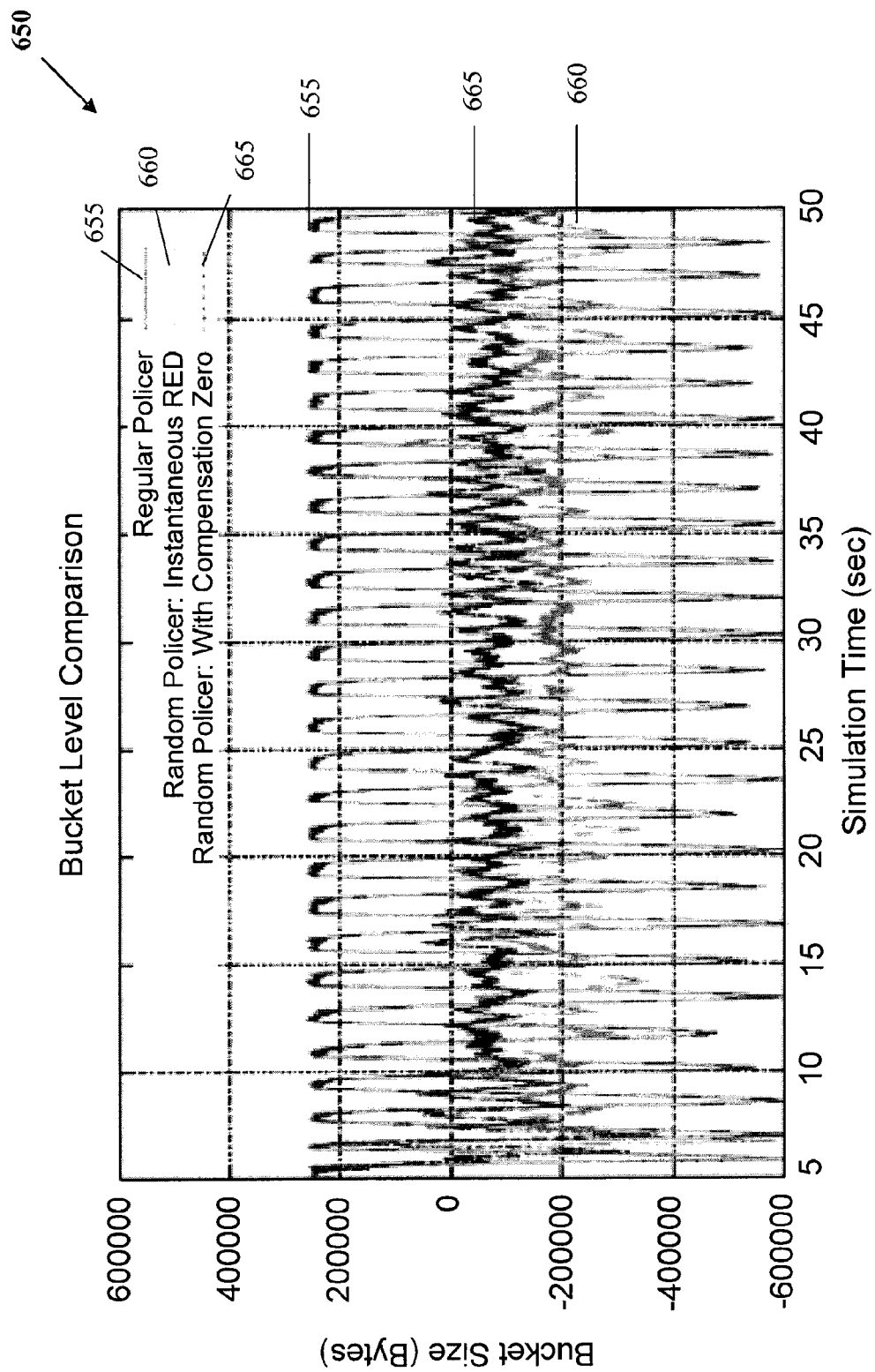

Graph 650 of FIG. 6C compares the results of a simulations using instantaneous VQL and average VQL as the bases for early detection/drop methods. The other parameters remain substantially the same. Curve 655 indicates that if RED is directly applied, without modification, to a token bucket policer, the network system oscillates and becomes unstable. By simply using instantaneous VQL to determine the drop probability, the system becomes stable as shown in Curve 665. We also achieve the goal of early random dropping. Curve 660 shows that by using predicted VQL, we can further improve the system's stability, which allows a wider range of operating regions as well. It will be observed that, contrary to what one might expect, using instantaneous VQL as a basis for implementing an early detection/drop method provides much more stability than using average VQL.

Figure 7:
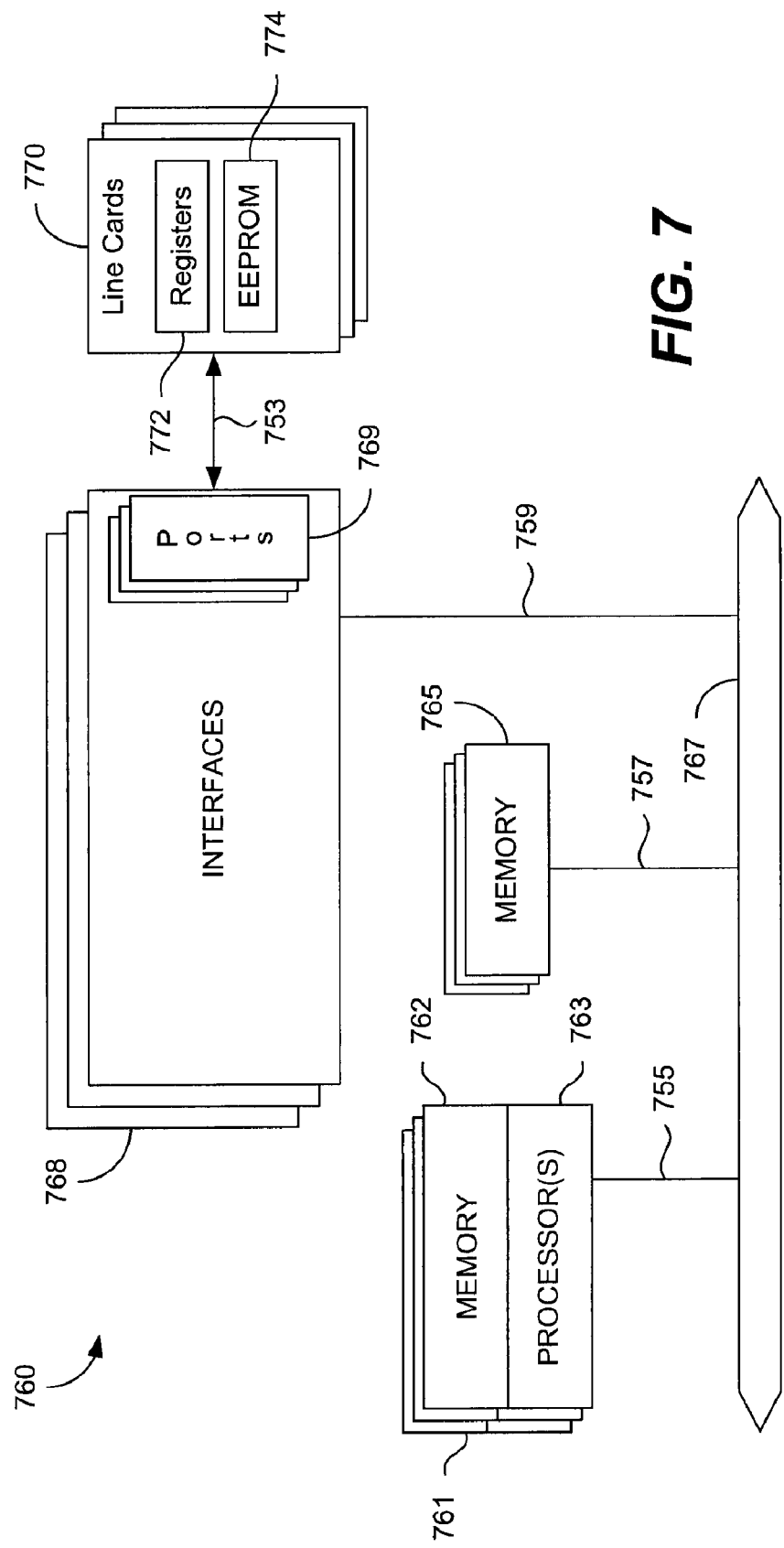
FIG. 7 is a network device that may be configured to implement some aspects of the invention.

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "line cards"). Generally, interfaces 768 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g. Linux, VxWorks, etc.), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 7) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method of controlling a network device, comprising:
   receiving a packet in the network device;
   determining that there are sufficient tokens in a token bucket to allow transmission of the packet; and
   applying a control method to determine whether to drop the packet, wherein the control method comprises treating a difference between a token bucket capacity and a token bucket level as a virtual queue, wherein a determination of whether to drop packets is based in part on a virtual queue size.

2. The method of claim 1, wherein the control method comprises:
   predicting a future virtual queue size based on a present virtual queue size; and
   calculating a drop probability according to a predicted future virtual queue size.

3. A method of controlling a network device, comprising:
   receiving a packet in the network device;
   determining that there are sufficient tokens in a token bucket to allow transmission of the packet; and
   applying a control method to determine whether to drop the packet, wherein the control method comprises determining a predicted token bucket level;
   wherein the control method further comprises assigning a zero probability that the packet will be dropped when the predicted token bucket level exceeds a predetermined level.

4. The method of claim 3, wherein the control method further comprises determining a token bucket level.

5. The method of claim 4, wherein the token bucket level comprises an instantaneous level or an average level.

6. The method of claim 3, wherein the control method further comprises determining a rate at which a token bucket level is being changed, wherein the predicted token bucket level is based on a current level and on a rate at which a token bucket level is being changed.

7. A method of controlling a network device, comprising:
   receiving a packet in the network device;
   determining that there are sufficient tokens in a token bucket to allow transmission of the packet; and
   applying a control method to determine whether to drop the packet, wherein the control method comprises determining a predicted token bucket level;
   wherein the control method further comprises assigning a non-zero probability that the packet will be dropped when the predicted token bucket level is below a predetermined level.

8. The method of claim 7, wherein the predicted token bucket level is based on a current level and on a rate at which a token bucket level is being changed.

9. The method of claim 7, wherein the predicted token bucket level is based on an instantaneous level or an average level.

10. The method of claim 7, wherein the control method further comprises determining a token bucket level.

11. The method of claim 10, wherein the token bucket level comprises an instantaneous level or an average level.

12. The method of claim 7, wherein the non-zero probability varies according to a rate at which the token bucket level is being changed.

13. The method of claim 7, wherein the non-zero probability varies according to an extent by which the token bucket level is below a predetermined level.

14. A network device including a processor and a memory, comprising:
    means for receiving a packet;
    means for determining that there are sufficient tokens in a token bucket to allow transmission of the packet; and
    means for applying a control procedure to determine whether to drop the packet, wherein the control procedure comprises determining a predicted token bucket level, determining a token bucket level, and assigning a non-zero probability that the packet will be dropped when the token bucket level is below a predetermined level.

15. A non-transitory computer-readable medium storing thereon computer-readable instructions for controlling a network device to perform the following steps:
    receiving a packet;
    determining that there are sufficient tokens in a token bucket to allow transmission of the packet; and
    applying a control procedure to determine whether to drop the packet, wherein the control procedure comprises determining a predicted token bucket level, wherein the control method further comprises assigning a non-zero probability that the packet will be dropped when the predicted token bucket level is below a predetermined level.

16. A line card for a network device, comprising:
    an interface configured for receiving packets; and
    a logic device configured to perform the following steps:
       determining that there are sufficient tokens in a token bucket to allow transmission of a packet; and
       applying a control procedure to determine whether to drop the packet, wherein the control procedure comprises determining a predicted token bucket level, wherein the control method further comprises assigning a non-zero probability that the packet will be dropped when the predicted token bucket level is below a predetermined level.

17. A method of controlling a network device, comprising:
    receiving a packet in the network device;
    determining that a policing method would allow transmission of the packet by comparing packet size of the packet with a predicted level of a token bucket, each token of the token bucket corresponding to an authorization for transmitting a predetermined unit of data;
    applying a control procedure to determine whether to drop the packet, the control procedure generating a probability based on the predicted level of the token bucket, the probability being greater than zero and less than one; and
    subsequently dropping or transmitting the packet based on the probability.

* * * * *